US007344055B2

(12) United States Patent
Macocha

(10) Patent No.: US 7,344,055 B2
(45) Date of Patent: Mar. 18, 2008

(54) PIVOTING WHEELCHAIR BACKPACK HOLDER

(76) Inventor: Chandler Matthew Macocha, 425 Lakes Edge Dr., Oxford, MI (US) 48371

(*) Notice: Subject to any disclaimer, the term of this patent is extended or adjusted under 35 U.S.C. 154(b) by 517 days.

(21) Appl. No.: 10/843,862

(22) Filed: May 12, 2004

(65) Prior Publication Data

US 2005/0001405 A1 Jan. 6, 2005

Related U.S. Application Data

(60) Provisional application No. 60/470,015, filed on May 13, 2003.

(51) Int. Cl.
*B60R 9/00* (2006.01)

(52) U.S. Cl. .................... 224/407; 224/401; 280/304.1

(58) Field of Classification Search ................ 224/401, 224/407, 502, 503, 518; 280/304.1
See application file for complete search history.

(56) References Cited

U.S. PATENT DOCUMENTS

| | | | | |
|---|---|---|---|---|
| 4,919,443 | A | 4/1990 | Kehler | |
| 5,104,015 | A * | 4/1992 | Johnson | 224/503 |
| 5,154,331 | A | 10/1992 | Sanders | |
| 5,180,181 | A * | 1/1993 | Letechipia | 280/304.1 |
| 5,246,240 | A * | 9/1993 | Romich et al. | 280/304.1 |
| 5,333,766 | A * | 8/1994 | Fisher | 414/465 |
| 5,518,159 | A * | 5/1996 | DeGuevara | 224/502 |
| 5,588,663 | A | 12/1996 | Rundle et al. | |
| 5,664,717 | A * | 9/1997 | Joder | 224/502 |
| 6,283,349 | B1 * | 9/2001 | Morris et al. | 224/502 |
| 6,499,756 | B2 * | 12/2002 | Amirola | 280/304.1 |
| 6,539,558 | B2 | 4/2003 | Shero | |

FOREIGN PATENT DOCUMENTS

JP 297062 * 1/1989

* cited by examiner

*Primary Examiner*—Nathan Newhouse
*Assistant Examiner*—Margaret Olson
(74) *Attorney, Agent, or Firm*—Whiteford, Taylor & Preston L.L.P.; Jeffrey C. Maynard; Joseph L. Morales

(57) ABSTRACT

A pivoting wheelchair backpack holder is provided. The pivoting wheelchair backpack includes a lever rod and a swing-out handle to move the lever rod, a frame moved by the lever rod, and a backpack attached to the frame. In its closed position, the backpack rests behind the user sitting in the wheelchair with the handle positioned flush to the side of the wheelchair. The user grabs the handle from its resting position, locks the handle into place against the lever rod, and pulls the handle to move the lever rod. The lever rod opens the frame, which then moves from the back of the wheelchair to the side of the wheelchair. A second hinged joint between the lever rod and frame allows the user to pull the backpack down toward the user. The user can access the backpack now at his or her side. The user can close the frame by pushing the frame back up, moving the handle in the opposite direction and replacing the handle to its resting position.

15 Claims, 7 Drawing Sheets

PIVOTING WHEELCHAIR BACKPACK HOLDER

CROSS REFERENCE TO RELATED APPLICATION

This application is based upon and claims benefit of co-pending U.S. Provisional Patent Application Ser. No. 60/470,015, filed with the U.S. Patent and Trademark Office on May 13, 2003 by the inventor herein, the specification of which is incorporated herein by reference.

FIELD OF THE INVENTION

The present invention relates to wheelchairs and in particular to a wheelchair with a holder with a hinged frame to hold a backpack which holds personal items of the user and the like.

BACKGROUND OF THE INVENTION

Wheelchairs provide an excellent service for those who need to own them. Wheelchairs allow those without mobility the chance to move around. However, wheelchairs do not allow users to carry many items. In fact, unimproved wheelchairs do not allow user to carry items that cannot fit on the user's lap. The prior art lacks devices that are a part of wheelchairs that aid in carrying personal items of the wheelchair user and which provide easy access to the backpack of the user of the wheelchair.

U.S. Pat. No. 4,919,443, to Kehler, has an issue date of Apr. 24, 1990. The invention is directed to a swing-out backpack for wheelchair use. The backpack comprises a container box with sides, a back, a front, a top, and a bottom. The box has a pivotal door therein to provide access to an interior chamber within the box. A structure releasably secures the container box to the side frame and back post assembly of the wheelchair. It includes a post to be secured in vertical orientation to the wheelchair at one side of the back thereof. The container box is pivotally mounted to the post to swing between a first position adjacent an armrest of the wheelchair and a second position behind the wheelchair. According to the present invention, the device may be readily adapted to most types of wheelchairs, and provides a removable, easily useable container box for use by a person in a wheelchair for supporting or storing objects.

U.S. Pat. No. 6,539,558, to Shero, has an issue date of Apr. 1, 2003. The patent is directed to an improved, multifunction, comfortable wheelchair with interchangeable padded seats. A bedpan is positioned on a rail underneath a hole in the seat and accesses a waste storage chamber. The bedpan can be emptied through a door in the front of the container.

U.S. Pat. No. 5,588,663, to Rundle et al., has an issue date of Dec. 31, 1996. The patent is directed to a multi-purpose wheelchair accessory that is secured to a side surface of a conventional wheelchair. The accessory includes a provision for holding personal items in a concealed compartment beneath an extension of an armrest. In addition, a cane is positioned along one end of the accessory allowing the wheelchair operator additional support if needed upon leaving the confines of the wheelchair. A tray table is stored along one side surface of the accessory and includes a hinge allowing the table to be rotated from a storage position into a horizontal plane directly in front of the armrest allowing the person a platform for working and eating. The accessory further extends outward wherein the cane operates as a leg providing an extended handrail in front of the wheelchair allowing the person who leaves the wheelchair a range of support that is not possible from the conventional armrest position. In addition, the apparatus detaches from the wheelchair and includes a curved section which allows the accessory to operate as a ramp. The ramp provides a first level of height which can be doubled by rotating of the cover into a support position.

U.S. Pat. No. 5,154,331, to Sanders, has an issue date of Oct. 13, 1992. The patent is directed towards a device for providing a secure storage area for the personal items of a wheelchair user. The device includes padded arm rests to encourage the user to rest their arms on the comfortable, padded surface, further enhancing the security of the storage device by making it more difficult to remove the storage device from the arm resting portions of the wheelchair without detection by the wheelchair user.

There is a need, however, for a wheelchair that can carry a backpack. The user can extend a handle from under his or her wheelchair's armrest. The user secures that handle into position. Then the user pulls it forward and a bar holding the backpack swings out and forward from the back of the wheelchair, bringing the backpack to the side where the user is able to reach it. The hinged joint further allows the user to pull the backpack down towards the user for easier access. None of the above patents meet this need and it would be beneficial to protect the pivoting wheelchair backpack holder.

OBJECTS AND SUMMARY OF THE INVENTION

It is an object of the present invention to provide a pivoting wheelchair backpack holder.

It is a further object of the present invention to provide a pivoting wheelchair backpack holder that moves on hinges and is activated by a swing-out handle and lever rod located under the armrest of the wheelchair.

It is yet a further object of the present invention to provide a pivoting wheelchair backpack holder that holds its position when the lever rod is open so that the backpack can move to the side of the user and be easily accessible for the user.

It is yet another further object of the present invention to provide a pivoting wheelchair backpack holder that holds its position when the lever rod is closed so that the backpack is kept to the back of the wheelchair when the user does not want to access the backpack. Additionally, the handle in its stowed position is adjacent to the side of the wheelchair.

In accordance with a first aspect of the present invention, a novel pivoting wheelchair backpack holder is provided. The holder includes a hinge in order to pivot, a lever rod under an armrest in the front of the wheelchair, a handle which moves the lever rod, a frame that the lever rod moves, and an open, expandable backpack that rests on the frame that is attached to the back of the wheelchair.

DETAILED DESCRIPTION OF THE PREFERRED EMBODIMENT

Figure 1:
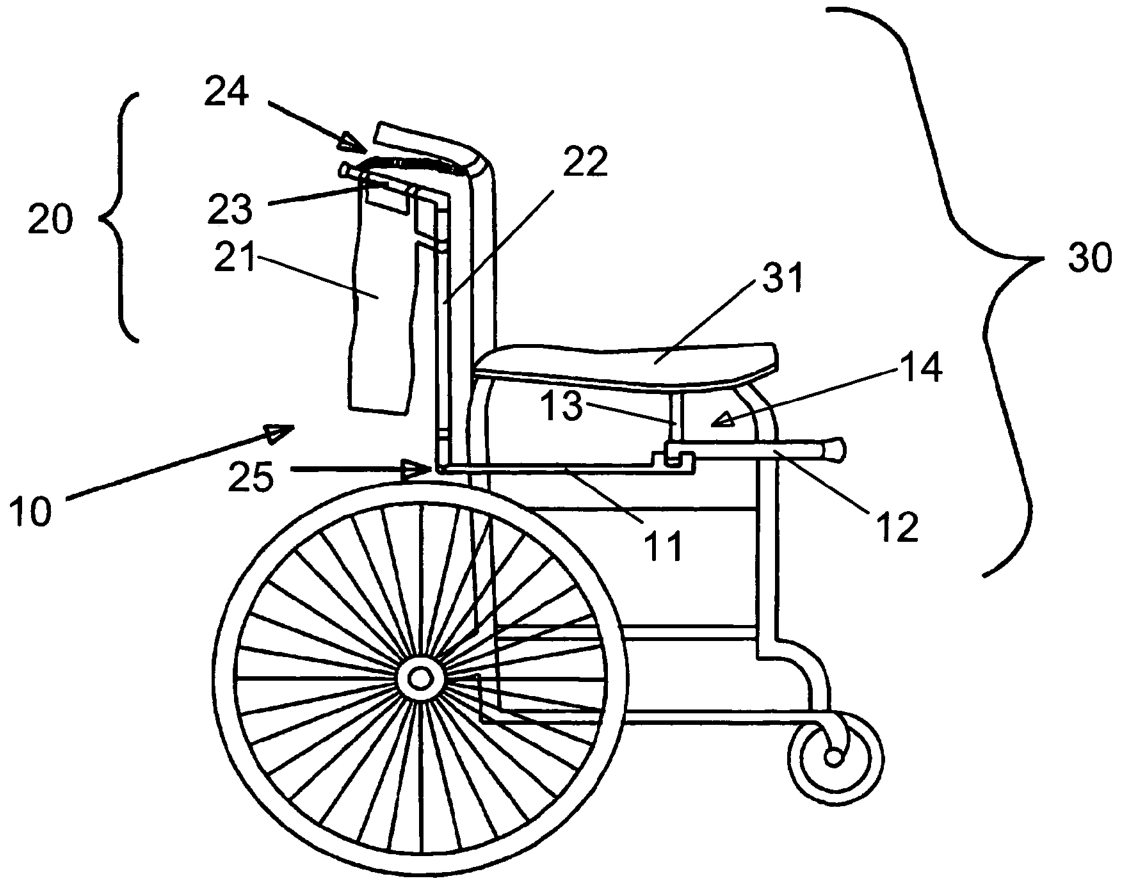
FIG. 1 is a side view of a wheelchair in accordance to the present invention with the frame closed.

In the drawings, similar features have been given similar reference numbers.

FIG. 1 shows a wheelchair 30 with the wheelchair backpack holder 10 in its retracted and rested position. The wheelchair backpack holder includes a pivot assembly 14, which includes a pivot pin 13, a handle 12, and a lever rod 11. A person sitting on the wheelchair 30 can move the handle 12 radially in relation to the pivot pin 13 and re-position the handle 12 into the lever rod 11 at a 90-degree angle. The person pushes the handle 12 which then moves the lever rod 11. The lever rod 11 moves the frame 20, rotating the backpack 21 to the side of the wheelchair. When the frame is in the retracted position, the lever rod 11 can be releasably attached to the wheelchair 30 by means of a clamp 60 that can be on the lever rod 11 or on the wheelchair structure.

Figure 2:
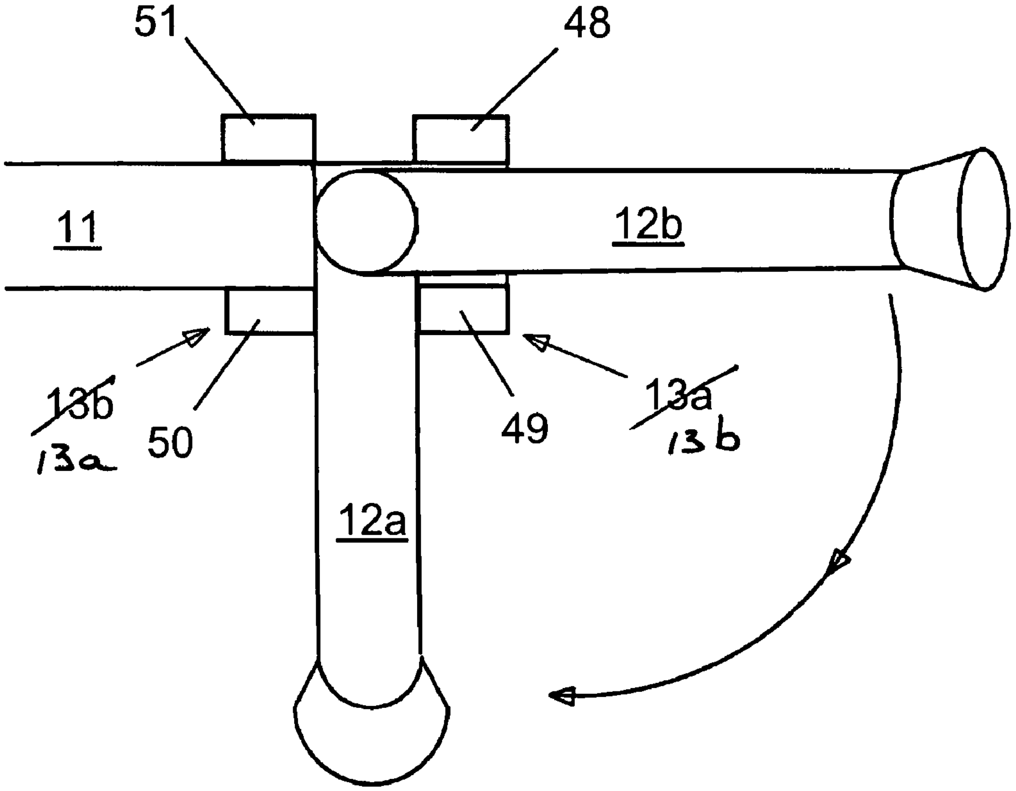
FIG. 2 is a top view of the handle in closed and open positions.
Figure 3:
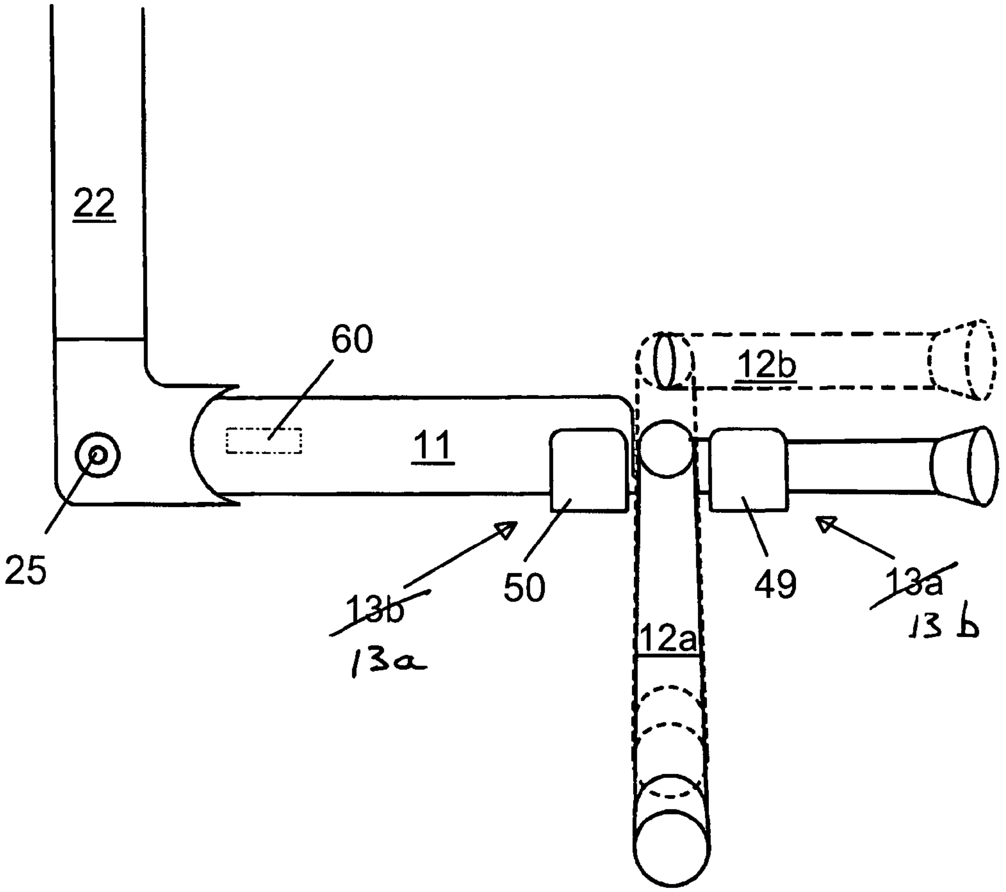
FIG. 3 is a perspective view of the handle in the retracted and deployed position.
Figure 4:
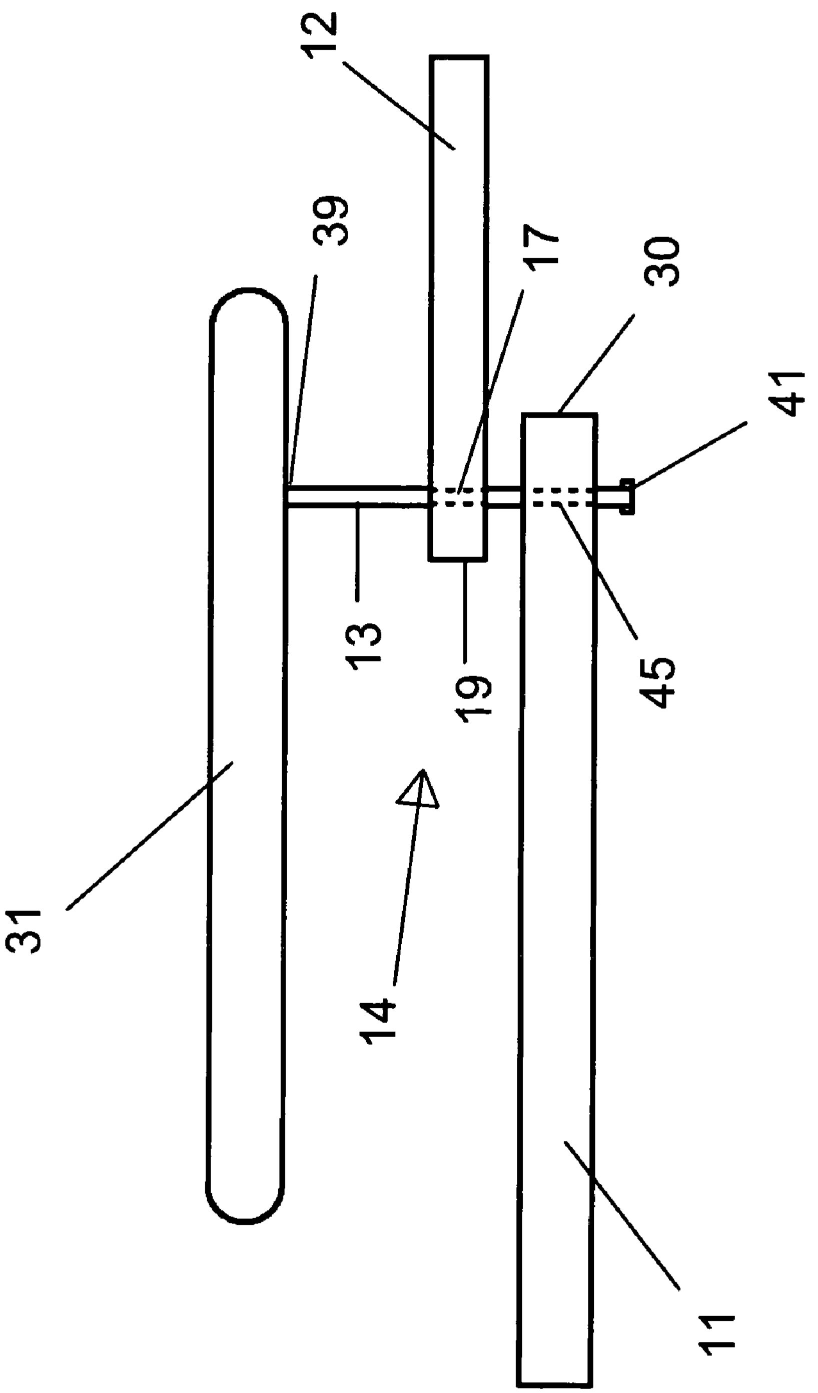
FIG. 4 is a side view of the handle pivot assembly.

The pivot assembly 14 is shown in FIGS. 2-4. A top end 39 of the pivot pin 13 is connected to armrest 31 portion of the wheelchair's 30 structure. The pivot pin 13 goes through a channel 17 near the proximal end 19 of the handle 12 in such a way that the handle 12 can travel vertically up and down and rotate about the pivot pin 13. The pivot pin 13 continues through a channel 45 near the proximal end 30 of the lever rod 11 in such a way that the lever rod 11 can rotate about the pivot pin 13. The bottom end 41 of the pivot pin 13 is constructed so that it keeps the handle 12 and lever rod 11 in place. FIG. 2 illustrates a top view of the pivot assembly 14 and FIG. 3 provides a perspective view of the same pivot assembly 14.

Referring to FIGS. 2 and 3, the handle 12 is secured in place by a forward bracket 13*b* having a pair of raised portions 48 and 49 on either side of the handle 12 as shown. Forward bracket 13*b* is located at the proximal end 30 of the lever rod 11 and can be within, or attached to, the lever rod 11. Forward bracket 13*b* secures the handle 12 when it is in the resting position. A side bracket 13*a* has additional raised portions 50 and 51 to secure the handle 12 when it is in the active position. When the handle is in the locked position of the side bracket 13*a* the entire backpack holder can rotate around the pivot pin 13 as the user moves the handle 12. The raised portions 48, 49, 50, 51 are oriented in such a way that when the handle 12 is in the resting position, the handle 12 is substantially aligned with the lever rod 11 and raised portions 48 and 51 are on one side of the handle while raised portions 49 and 50 are on the opposite side of the handle 12. Further, the raised portions 48, 49, 50, 51 are oriented such that when the handle 12 is in the active position, the handle 12 is approximately perpendicular to the lever rod 11 and raised portions 48 and 49 are on one side of the handle while raised portions 50 and 51 are on the opposite side of the handle 12. The arrangement of the raised portions allows the frame 20 to rotate around the wheelchair and the user can then reach the backpack 21.

Figure 6:
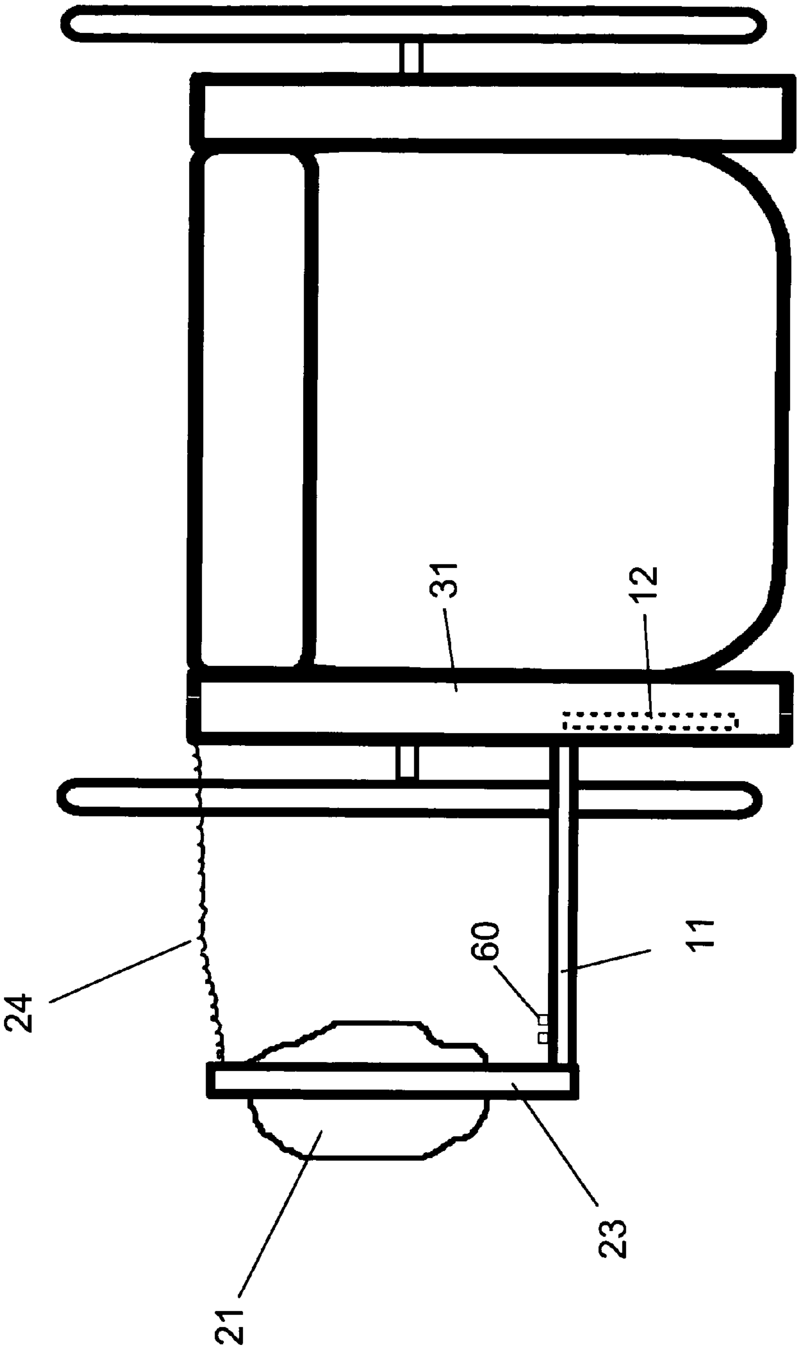
FIG. 6 is a top view of a wheel chair showing the backpack holder of the present invention in a deployed position.
Figure 7:
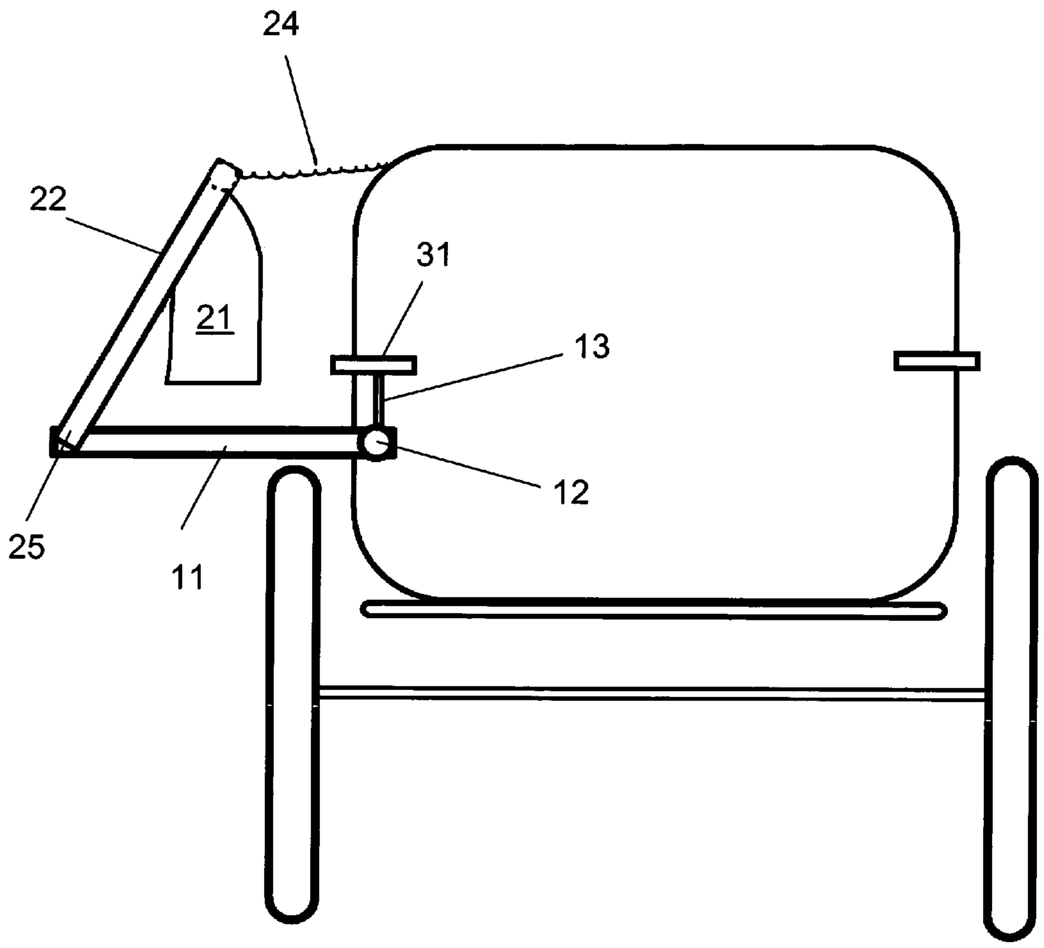
FIGS. 7 is a front elevational view of a wheel chair showing the backpack holder of the present invention in a deployed position.

The frame 20 comprises a first frame rod 22 attached to the second frame rod 23 at a 90-degree angle. The second frame rod 23 is attached to a spring 24. (Alternatively, the first frame rod 22 and the second frame rod 23 may be one continuous bar with a similar 90-degree angle). The spring 24 is attached to the wheelchair 30. The spring 24 helps to balance the load of the backpack 21. (Alternatively, load balancing can be achieved via hinged attachments between the wheelchair 30 and first frame rod 22 or lever rod 11). The lever rod 11 is attached to the first frame rod 22 through the use of a hinged joint 25. The hinged joint 25 allows the user to move the frame 20 from the retracted position behind the wheelchair 30, as shown in FIG. 1. closer to him or her after engaging the pivot assembly 14 and rotating the frame 20 around the wheelchair 30 to a deployed position. as shown in FIGS. 6 and 7.

Figure 5A:
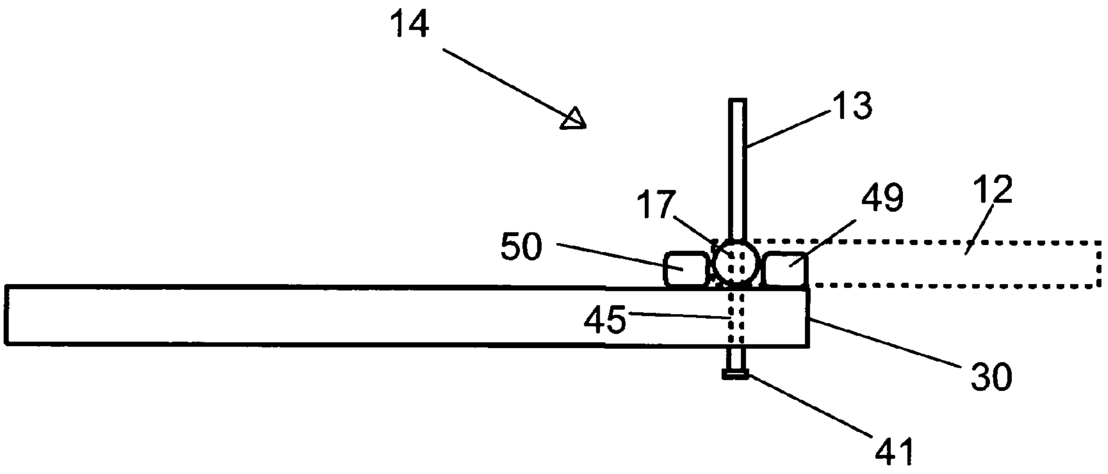
FIGS. 5*a* and 5*b* are side and end close-up views, respectively of the handle pivot assembly.
Figure 5B:
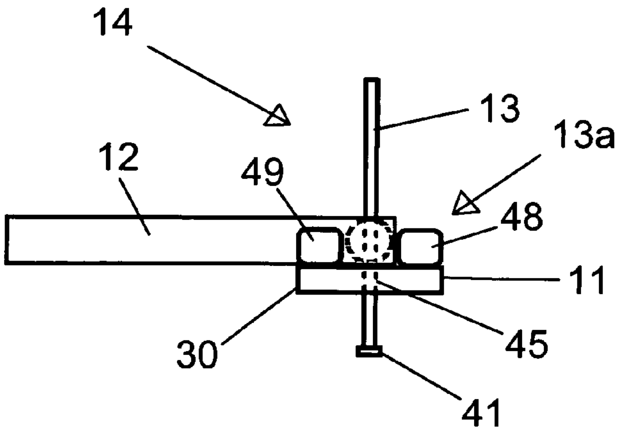

FIGS. 2 and 3 show the handle 12 in its rested position 12*b*, substantially aligned with the lever rod 11. The handle 12 can be moved to the active position 12*a*, which is at a 90-degree angle relative to the rested position. In the specific embodiment described herein, in order to move the handle 12 from the rest position 12*b* to the active position 12*a*, the handle 12 is raised vertically along the pivot pin 13 so that the handle 12 is out of the forward bracket 13*a* and above the raised portions 48, 49, 50, 51. The handle 12 can then be rotated on the pivot pin 13 so that the handle 12 is approximately perpendicular to the lever rod 11. Then the handle 12 is lowered alone the pivot pin into the side bracket 13*b* so that the raised portions 48, 49, 50, 51 are once again on the sides of the handle 12. FIG. 5*a* shows a side view of the handle pivot assembly 14. The handle 12 is shown in phantom in the rested position. FIG. 5*b* shows a front end view of the handle pivot assembly 14 with the handle 12 shown in the active position. The handle 12 and lever rod 11 are attached to and rotate about the pivot pin 13.

When the lever rod 11 is thrust forward, the first frame rod 22 rotates the backpack 21 outward. The backpack 21 can now be further accessed by pulling down on the second frame rod 23 via the hinged joint 25, as shown in FIG. 7.

In use, the backpack holder 10 is initially in the retracted position behind the wheelchair 30. To gain access to the backpack 21 while seated in the wheelchair 30, a user lifts handle 12 out of the forward bracket 13*a* and rotates the handle 12 outward approximately perpendicular to the lever rod 11. The user then lowers the handle 12 into the side bracket 13*b*. Then the user can rotate the handle 12 forward, which causes the lever rod 11 to swing outward and brings the frame 20 and backpack 21 to the side of the wheelchair 30. With the backpack holder in the deployed position alongside the wheelchair 30, the user can then grasp the backpack 21 and pull it toward him or her. The hinged joint 25 enables the backpack 21 to swing even closer to the user.

The present invention has been described and illustrated here, but modifications may be made by one of ordinary skill in the art without departing from the scope and spirit of the invention as defined in the claims.

What is claimed is:

1. A wheelchair backpack holder comprising:

a pivot assembly, comprising a handle and a lever rod, said lever rod having a first end and a second end; the first end of the lever rod being pivotally attached to the wheelchair, and said handle having a first end and a second end; the first end of the handle being pivotally attached to the wheelchair, wherein said handle is movable from a first position in which the handle is substantially aligned with said lever rod to a second position in which the handle is approximately perpendicular to said lever rod, and wherein, when said handle is in said second position, said handle engages said lever rod in such a way as to enable movement of said handle to cause movement of said lever rod; and a frame attached to the second end of the lever rod, said frame capable of holding a backpack and a load of contents within and being rotatable by the lever rod.

2. A wheelchair backpack holder comprising:

(a) a handle having a proximal end and a distal end, wherein the proximal end is pivotally attached to a bottom side of a wheelchair arm by a pivot pin;

(b) a lever rod having a first end and a second end, wherein the first end is pivotally attached to the bottom side of the wheelchair arm by the pivot pin to which the proximal end of the handle is attached, and wherein the second end is pivotally attached to a backpack frame;

(c) a bracket that locks the proximal end of the handle to the first end of the lever rod and allows the lever rod and the handle to pivotally rotate together, and (d) a backpack frame.

3. The wheelchair backpack holder of claim 2, wherein the backpack frame comprises:

(a) a first frame rod with a lower end and an upper end, wherein the lower end is connected to the second end of the lever rod, and (b) a second frame rod with an inner end and an outer end, wherein the inner end is connected to the upper end of the first frame rod.

4. The wheelchair backpack holder of claim 3, wherein the lower end of the first frame rod is pivotally connected to the second end of the lever rod.

5. The wheelchair backpack holder of claim 3, wherein the outer end of the second frame rod is connected to the wheelchair.

6. The wheelchair backpack holder of claim 5, wherein the second frame rod is connected to the wheelchair through a spring having an anchor end and a support end, wherein the anchor end is connected to the wheelchair and the support end is connected to the second frame rod.

7. The wheelchair backpack holder of claim 5, wherein the anchor end of the spring is connected to a clamp that is connected to a wheelchair handle.

8. The wheelchair backpack holder of claim 2, further comprising a bracket on the first end of the lever rod that holds the handle in a forward position.

9. The wheelchair backpack holder of claim 2, further comprising a clamp on the lever rod that secures the lever rod to the wheelchair.

10. The wheelchair backpack holder of claim 2, further comprising a backpack.

11. The wheelchair backpack holder of claim 10, wherein the backpack is attached to the backpack frame.

12. The wheelchair backpack holder of claim 2 wherein the first frame rod is hingedly attached to the back of the wheelchair, which operates to balance the load of the backpack.

13. The wheelchair backpack holder of claim 2 wherein the lever rod is hingedly attached to the back of the wheelchair, which operates to balance the load of the backpack.

14. The wheelchair backpack holder of claim 2, wherein the frame is hingedly attached to the lever rod to allow easier access to contents in the backpack.

15. A method for utilizing a wheelchair backpack holder, comprising (a) supplying a lever rod, a handle and a backpack frame, (b) pivotally installing the lever rod, the handle and the backpack frame on a wheelchair, (c) placing the handle on a resting position with a distal end facing toward a front portion of the wheelchair, (d) placing the lever rod in a resting position with a second end facing towards a back portion of the wheelchair, (e) placing the backpack frame in a resting position behind the wheelchair, (f) moving the handle from its resting position towards a predetermined position for engaging a pivot assembly connected to the lever rod and the backpack frame, (g) engaging the handle with the pivot assembly, (h) turning the handle towards the front portion of the wheelchair causing the lever rod and backpack frame to rotate towards the front portion of the wheelchair, (i) pulling the backpack frame towards the wheelchair, (j) returning the backpack frame, lever rod, and handle to the resting position.

* * * * *